United States Patent Office 2,698,946
Patented Jan. 11, 1955

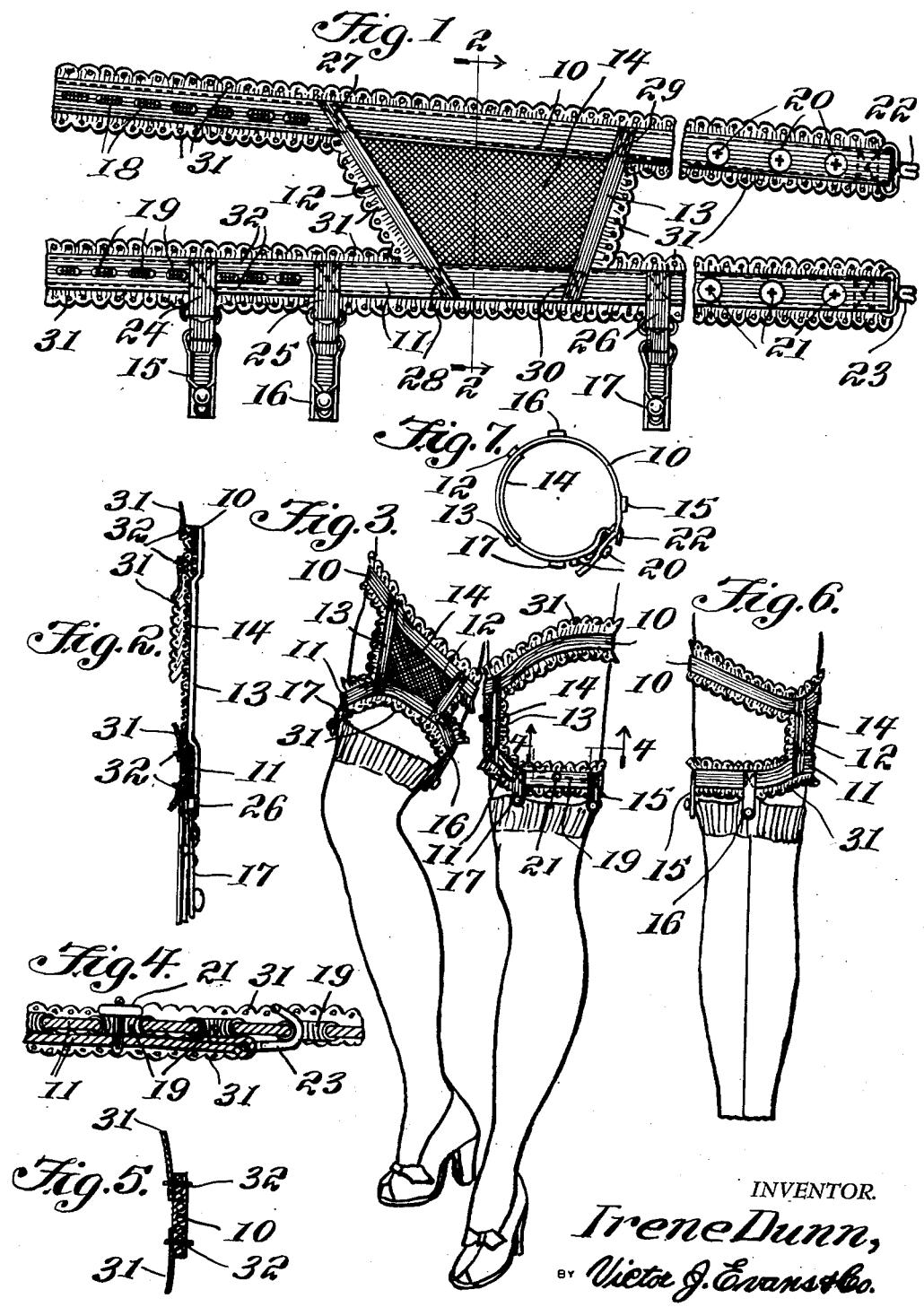
Jan. 11, 1955 — I. DUNN — 2,698,946
ADJUSTABLE GARTER
Filed Dec. 16, 1952
INVENTOR.
Irene Dunn,
BY Victor J. Evans & Co.
ATTORNEYS

2,698,946
ADJUSTABLE GARTER
Irene Dunn, Los Angeles, Calif.

Application December 16, 1952, Serial No. 326,317

4 Claims. (Cl. 2—308)

This invention relates to adjustable garters, particularly of the type used independent of the conventional girdles, and in particular supporting elements or garters formed with spaced elastic bands connected with elastic strips and webbing and positioned around the thighs providing independent hose supporting elements.

The purpose of this invention is to provide continuous hose supporting elements for use where girdles are not used and which continuously support hose in all positions of the legs substantially the same as the conventional waist girdle.

Various attempts have been made to support hose without conventional elastic or girdles usually worn around the waist, however, with independent supporting devices of this type it is difficult to maintain tension in the hose or hold the seams in the center of the back continuously from morning until night particularly while walking, sitting, or driving a motor vehicle. With this thought in mind this invention contemplates the combination of conventional hose supporters with individual girdles positioned around the thighs of each leg whereby spaced upper and lower elastic bands of each girdle prevent slipping and provide supporting garters that hold the hose in position and also in tension continuously.

The object of this invention is, therefore to provide supporting elements that are adapted to replace the conventional girdle or garter belt and that support the hose from the thighs.

Another object of the invention is to provide individual garters for supporting hose from thighs of an individual in which the hose are gripped with conventional clasps.

A further object of the invention is to provide individual garters or hose supporting elements adapted to be used on the thighs in which the elements are of a simple and economical construction.

With these and other objects and advantages in view the invention embodies spaced upper and lower elastic bands with fastening elements on the ends and with the bands connected with elastic strips at points intermediate of the ends and also in which sections of webbing are provided between the elastic strips and bands.

Other features and advantages of the invention will appear from the following description taken in connection with the drawing, wherein;

Figure 1 is an elevational view illustrating one of the individual adjustable garters with parts broken away.

Figure 2 is a cross section through the intermediate part of the garter taken on line 2—2 of Fig. 1.

Figure 3 is a view illustrating the positions of the hose supporting elements as the supporting devices appear in use.

Figure 4 is a section taken on line 4—4 of Fig. 3 illustrating the combination of fastening elements at the ends of the elastic bands wherein the ends are secured with both buttons and hooks.

Figure 5 is a detail showing a typical cross section through one of the elastic bands of the garter illustrating the trim extended from the edges.

Figure 6 is a rear elevational view of a leg showing the hose supporting elements in the position of supporting a stocking with the seam positioned in the center of the back.

Figure 7 is a sectional plan through one of the hose supporting elements illustrating the position of the net in relation to the fastening elements.

Referring now to the drawing wherein like reference characters denote corresponding parts the improved adjustable garter of this invention includes an upper elastic band 10, a lower elastic band 11, elastic strips 12 and 13 connecting the bands 10 and 11, webbing 14 positioned in the area between the strips 12 and 13 and bands 10 and 11, and hose supporting clasps 15 and 16, and 17.

Each of the bands 10 and 11 is provided with spaced button holes, in one of the ends thereof and with buttons 20 and 21 and hooks 22 and 23 on the opposite ends.

The clasps 15, 16 and 17, which are conventional hose clasps are mounted on the lower band 11 by stitching tapes 24, 25 and 26 to the band, as shown in Fig. 1 and although these clasps are positioned with the clasp 16 in the center of the back, the clasp 15 on the side, and the clasp 17 in the front, it will be understood that these clasps may be positioned at other suitable points.

The elastic strip 12 is stitched to the upper band 10 at the point 27 and to the lower band 11 at the point 28 and the strip 13 is stitched to the upper band 10 at the point 29 and to the lower band at the point 30.

The insert 14 is preferably formed of nylon webbing, although it may be formed of other suitable material.

The edges of the elastic bands and strips may be finished with lace trim as indicated by the numeral 31 and it will be understood that this may be provided in different designs. The trim may be attached to the elements with stitches as indicated by the numeral 32 and the edges of the insert may also be secured to adjoining edges of the band and strips by stitching or other suitable means.

With the parts assembled in this manner the adjustable garters are positioned on the thighs with the ends of the elastic bands connected with the buttons and hooks, as illustrated in Fig. 4 whereby the devices are positively secured in position and whereby the tension on the band is readily adjustable to provide comfort to the wearer.

With the use of independent adjustable garters of this type seams of hose may be maintained exactly in the center of the back continuously and constant tension is maintained in the hose from early morning until late at night and with the wearer walking, sitting, or positioned behind a wheel of a motor vehicle.

It will be understood that the garters of this invention are provided right and left hand whereby, as illustrated in the drawing the inserts are positioned on the inner surfaces of the thighs and the fastening elements on the outside, and with the parts positioned in this manner the upper and lower bands coact to hold the devices in position continuously.

It will be understood that modifications, within the scope of the appended claims may be made in the design and arrangement of the parts without departing from the spirit of the invention.

What is claimed is:

1. In an adjustable garter, the combination which comprises spaced upper and lower elastic bands, spaced elastic strips connecting the bands at points substantially midway of the ends of the bands, there being a short strip and a long strip, the lower ends of the strips being spaced apart a less distance than the upper ends of the strips and the short strip spacing the bands closer together than the long strip so that the bands extend in angular relation to each other, a mesh insert positioned in the area between the strips and bands, each of said bands having a line of spaced button holes in one of the ends thereof and a line of equally spaced buttons and hook on the opposite end, so that when the ends of the bands are overlapped as in use the buttons will coincide with the button-holes and the hook on the opposite end of the band will be engaged in one of the button-holes beyond the button nearest the hook, and spaced hose clasps depending from the lower band, said elastic strips connecting the bands being diagonally positioned in relation to the bands with the distance between the upper ends of the strips greater than the distance between the lower ends thereof.

2. In a hose supporting adjustable garter, the combination which comprises spaced upper and lower elastic bands, spaced elastic strips connecting the bands at points substantially midway of the ends of the bands, there being a short strip and a long strip, the lower ends of the strips being spaced apart a less distance than the upper ends of the strips and the short strip spacing the bands closer together than the long strip so that the bands extend in angular relation to each other, a mesh insert positioned in the area between the strips and bands, each of said bands having a line of spaced button holes in one of the ends thereof and a line of equally spaced buttons and hook on the opposite end, so that when the ends of the bands are overlapped as in use the buttons will coincide with the button-holes and the hook on the opposite end of the band will be engaged in one of the button-holes beyond the button nearest the hook and spaced hose clasps depending from the lower band, said elastic strips connecting the bands being diagonally positioned in relation to the bands with the distance between the upper ends of the strips greater than the distance between the lower ends thereof, said strips and clasps being attached to the bands by stitching.

3. In an adjustable garter, the combination which comprises spaced upper and lower elastic bands, spaced elastic strips connecting the bands at points substantially midway of the ends of the bands, there being a short strip and a long strip, the lower ends of the strips being spaced apart a less distance than the upper ends of the strips and the short strip spacing the bands closer together than the long strip so that the bands extend in angular relation to each other, a mesh insert positioned in the area between the strips and bands, each of said bands having a line of spaced button holes in one of the ends thereof and a line of equally spaced buttons and hook on the opposite end, so that when the ends of the bands are overlapped as in use the buttons will coincide with the button-holes and the hook on the opposite end of the band will be engaged in one of the button-holes beyond the button nearest the hook and spaced hose clasps depending from the lower band, said elastic strips connecting the bands being diagonally positioned in relation to the bands with the distance between the upper ends of the strips greater than the distance between the lower ends thereof, said strips and clasps being attached to the bands by stitching, and said bands and strips having lace trim on the edges.

4. In an adjustable garter, the combination which comprises spaced upper and lower elastic bands, spaced elastic strips connecting the bands at points substantially midway of the ends of the bands, there being a short strip and a long strip, the lower ends of the strips being spaced apart a less distance than the upper ends of the strips and the short strip spacing the bands closer together than the long strip so that the bands extend in angular relation to each other, a mesh insert positioned in the area between the strips and bands, each of said bands having a line of spaced button holes in one of the ends thereof and a line of equally spaced buttons and hook on the opposite end, so that when the ends of the bands are overlapped as in use the buttons will coincide with the button-holes and the hook on the opposite end of the band will be engaged in one of the button-holes beyond the button nearest the hook and spaced hose clasps depending from the lower band, said elastic strips connecting the bands being diagonally positioned in relation to the bands with the distance between the upper ends of the strips greater than the distance between the lower ends thereof and said strips positioned whereby the distance between the bands at the center is less than the distance at one of the ends of the bands.

References Cited in the file of this patent

UNITED STATES PATENTS

| | | |
|---|---|---|
| 208,387 | George | Sept. 24, 1878 |
| 1,206,070 | Wohlgemuth | Nov. 28, 1916 |
| 1,338,858 | Enriquez | May 4, 1920 |
| 1,374,572 | Hurd | Apr. 12, 1921 |
| 1,404,181 | Alsop | Jan. 24, 1922 |
| 1,948,251 | Andrews | Feb. 20, 1934 |
| 2,242,561 | Walz | May 20, 1941 |
| 2,487,649 | Grisanti | Nov. 8, 1949 |